(12) United States Patent
Tamura

(10) Patent No.: US 6,932,427 B2
(45) Date of Patent: Aug. 23, 2005

(54) SUITCASE WITH FOLDABLE CHAIR

(76) Inventor: Yoshiaki Tamura, 1-8-13 Arai, Ichikawa-shi, Chiba (JP), 272-0144

( * ) Notice: Subject to any disclaimer, the term of this patent is extended or adjusted under 35 U.S.C. 154(b) by 0 days.

(21) Appl. No.: 10/493,260

(22) PCT Filed: May 24, 2002

(86) PCT No.: PCT/JP02/05056
§ 371 (c)(1),
(2), (4) Date: Jun. 15, 2004

(87) PCT Pub. No.: WO03/099056
PCT Pub. Date: Dec. 4, 2003

(65) Prior Publication Data
US 2004/0251717 A1 Dec. 16, 2004

(51) Int. Cl.[7] .......................... A47C 13/00; A45C 13/38
(52) U.S. Cl. .................. 297/217.1; 297/14; 297/17; 190/8; 190/12 A
(58) Field of Search .................. 297/217.1, 14, 297/17; 280/643, 642, 30, 47.25, 648, 647, 650; 190/8, 12 A, 1

(56) References Cited

U.S. PATENT DOCUMENTS

| | | | |
|---|---|---|---|
| 2,340,788 A | * 2/1944 | Aylor | 297/17 |
| 2,545,336 A | * 3/1951 | Binder | 280/650 |
| 2,786,692 A | * 3/1957 | Timpson | 280/648 |
| 4,369,987 A | * 1/1983 | Witherell | 280/644 |
| 4,550,813 A | * 11/1985 | Browning | 190/18 A |
| 4,846,486 A | * 7/1989 | Hobson | 280/47.25 |
| 5,273,307 A | * 12/1993 | Jarke et al. | 280/643 |
| 5,374,073 A | * 12/1994 | Hung-Hsin | 280/30 |
| 5,437,367 A | * 8/1995 | Martin | 206/320 |
| 5,515,954 A | * 5/1996 | Nordstrom | 190/18 A |
| 5,779,112 A | * 7/1998 | Krulik | 224/155 |
| 5,899,467 A | * 5/1999 | Henkel | 280/47.25 |
| 6,196,560 B1 | * 3/2001 | Ohlsson | 280/30 |
| D459,883 S | * 7/2002 | Worrell et al. | D3/274 |
| 6,471,019 B1 | * 10/2002 | Miller | 190/11 |
| 6,644,447 B2 | * 11/2003 | Pohl | 190/8 |

FOREIGN PATENT DOCUMENTS

| | | | | |
|---|---|---|---|---|
| DE | 2933595 A | * | 8/1980 | A45C/9/00 |
| JP | 57-179824 | | 11/1982 | |
| JP | 3012425 | | 4/1995 | |
| JP | 9-329 | | 1/1997 | |
| JP | 9-28438 | | 2/1997 | |
| JP | 2002-142832 | | 5/2002 | |
| PT | 102206 A | * | 4/2000 | A47C/13/00 |

* cited by examiner

*Primary Examiner*—Peter M. Cuomo
*Assistant Examiner*—Stephen D'Adamo
(74) *Attorney, Agent, or Firm*—Jordan and Hamburg LLP

(57) ABSTRACT

A suitcase with a foldable chair usable as a normal suitcase and also usable as a cart, a chair or a buggy, comprising a suitcase body (11), a pair of wheels (14b) attached onto the bottom surface of the suitcase body near the rear surface, a foldable base plate (12) rotatably installed on the front surface side of the suitcase body at the lower position, a pair of wheels (14a) fitted to the tip of the foldable base plate, fixing devices (13) fixing the foldable base plate to the suitcase body, a foldable seat plate (21) rotatably installed on the front surface of the suitcase body at the position over the installed the foldable base plate, and auxiliary rails (24) opposedly installed on both sides of the foldable base plate rotatably relative to the suitcase body.

6 Claims, 5 Drawing Sheets

SUITCASE WITH FOLDABLE CHAIR

TECHNICAL FIELD

The present invention relates to a suitcase with a foldable chair which is provided on one side of the suitcase and conveniently usable as a chair for carrying a child, an aged or a handicapped person for emergency care or as a resting chair in the airport waiting room and so forth.

BACKGROUND ART

With the graying of the population in recent years, middle aged and elderly couples are expected to go on travels in increasing numbers. Among travelers, those aged who are unable to put up with long-time walking due to their weak lower back and legs and those accompanied with children would feel it burdensome to convey a wheelchair, a baby carriage or buggy in addition to a suitcase; the problem is that conveying such an additional carriage may result in marring the otherwise enjoyable travel. Suitcases have commonly been used on overseas travel and travel intended for a long stay. Such a suitcase is generally provided with four wheels attached to its base portion, so that the suitcase can be conveyed by manually pushing it. However, it is not only difficult to manage to convey a wheelchair, a baby carriage or a hand cart together with a suitcase in the airport lobby but also extremely dangerous and problematic to do so in case that the departure time is drawing near in particular because one may be thrown into a panic.

On the other hand, there is a known cart called a portable carrying case formed by providing a frame body having a handgrip with a cloth-made bag. Although this cart is convenient for use as a hand-baggage conveying means, its capacity is too small to make the cart usable as a suitcase. Japanese Patent Laid-Open No. 28438/1997 discloses a 'suitcase with a chair.' Further, Japanese Utility Model Laid-Open No. 179824/1982 discloses a device for a trunk with a baggage holding stand mounted on its surface and Japanese Utility Model Registration No. 3012425 discloses a bag that can be attached by tightening to a cart by means of a band.

However, the invention described in Japanese Patent Laid-Open No. 28438/1997 is entirely different in structure from the present invention applied for patent in that the former refers to a bag with a chair attached to its back and is not intended to carry a person sitting in the chair. The problem with the device described in Japanese Utility Model Laid-Open No. 179824/1982 above is that baggage that can be loaded on the device is limited to an extremely small amount like the conventional carrying case because a frame for carrying baggage is provided on one side of the trunk. Further, the device described in Japanese Utility Model Registration No. 3012425 is different from the present invention in that the device is not so aimed nor configured as to carry baggage other than the bag because the cart loaded with the bag itself can be conveyed and because the cart can also be contained in the bag when the cart is not in use.

DISCLOSURE OF THE INVENTION

Problems to be Solved by the Invention

In view of solving the foregoing problems, the invention is quite innovative as compared with the current model in point of the fact that any person is allowed to remain seated in a chair incorporated with one side of a suitcase during traveling. An object of the invention is to provide a suitcase with an extremely simple, convenient foldable chair such that even a plurality of pieces of baggage such as golf goods, souvenir bags and so forth can be placed on a foldable base plate as a cart formed by folding up the foldable chair and carried around together with the suitcase; the suitcase is usable as a normal suitcase only by folding up the foldable chair and the foldable base plate when the cart is not in use; no useless space is required when the suitcase is in one's safekeeping; and the suitcase can easily be carried around during overseas travel, for example, and also used for physical care.

Means for Solving the Problems

In order to solve the foregoing problems, a suitcase with a foldable chair according to the invention, comprises a suitcase body, a pair of wheels attached onto the bottom surface of the suitcase body near the rear surface, a foldable base plate rotatably installed on the front surface side of the suitcase body at the lower position, a pair of wheels fitted to the tip of the foldable base plate, fixing devices fixing the foldable base plate to the suitcase body, a foldable seat plate rotatably installed on the front surface of the suitcase body at the position over the installed foldable base plate, and auxiliary rails opposedly installed on both sides of the foldable seat plate rotatably relative to the suitcase body, wherein with the foldable chair being not in use, the foldable base plate, the fixing devices, the foldable seat plate and the auxiliary rails are folded flat before being retracted inside the surface of the suitcase body in substantially one plane, and the front end portion of the foldable base plate together with the wheels attached to the bottom surface of the suitcase body are arranged on the floor so as to support the suitcase body when the foldable base plate is folded up or extended; and with the foldable chair being in use, the foldable base plate, the fixing devices, the foldable seat plate and the auxiliary rails are drawn forward out of the surface of the suitcase body, so that a chair can solidly be assembled (Claim 1).

In order to solve the foregoing problems, the suitcase with the foldable chair according to the invention is typically such that the foldable seat plate is bent into a substantially right angle to form a horizontal seat portion and a perpendicular leg portion; the front end of the leg portion is fixed to the extended foldable base plate; and the auxiliary rails are bent into a substantially right angle so as to fix the front end portions of the auxiliary rails to the seat portion of the foldable seat plate, so that a chair can solidly be assembled (Claim 2).

In order to solve the foregoing problems, the suitcase with the foldable chair according to the invention is typically such that the fixing devices are extensible fixing levers; one end of each fixing device is rotatably mounted to the suitcase body, whereas the other end is detachably attached to both ends of the foldable base plate, so that the foldable base plate is coupled to the surface of the suitcase body at substantially right angles; and the foldable base plate is folded up by removing one end of each fixing device from the foldable base plate (Claim 3).

In order to solve the foregoing problems, the suitcase with the foldable chair according to the invention is typically such that the foldable seat plate and the auxiliary rails are folded flat before being drawn toward the surface of the suitcase body; and the foldable base plate and the fixing devices are drawn forward out of the surface of the suitcase body so as to support the foldable base plate at a substantially right angle with the surface of the suitcase body whereby to make the suitcase usable as a cart (Claim 4).

In order to solve the foregoing problems, the suitcase with the foldable chair according to the invention is typically such that the foldable base plate is formed with two sheets of flat plates different in length in the longer direction; one end of the short flat plate is rotatably mounted to the position of the lower portion of the surface of the suitcase body; the pair of wheels are provided near the end portion of the long flat plate; and the pair of wheels are so arranged as to fall into place in the gap formed between the base portion of the suitcase body and the foldable base plate when the foldable base plate is folded up (Claim 5).

In order to solve the foregoing problems, the suitcase with the foldable chair according to the invention is typically such that a handle is installed so that it is stored in the rear surface portion of the suitcase body and can be pulled up and latched at the pulled-up position (Claim 6).

Operation

The pair of wheels are provided in the front end portion of the foldable base plate of the suitcase with the foldable chair and when the foldable base plate is folded up, the suitcase body is movably supported on the floor surface by the wheels mounted to the front end portion thereof and the pair of wheels mounted to the base portion of the suitcase body. When the foldable base plate is pulled out vertically relative to the surface of the suitcase body, the wheels in the front end portion of the foldable base plate are mainly used for supporting the cart portion on the floor surface. The cart portion and the suitcase body are supported substantially horizontally on the floor by the wheels in the front end portion of the foldable base plate and the wheels on the suitcase body side.

The foldable base plate and the fixing devices are folded flat and stored inside the substantially central portion up to the upper portion of the surface side of the suitcase body, and the foldable seat plate and the auxiliary rails are folded flat and stored in the lower portion thereof in substantially one plane, this construction functioning as what makes the external appearance of the suitcase better. The foldable base plate, the fixing devices and so forth are used to constitute a cart and of the foldable seat plate forming the chair, the seat portion is formed by the horizontal portion; the leg portion is formed by the vertical portion; armrest portions are formed by the auxiliary rails; and the back is formed by the surface of the suitcase. Accordingly, the suitcase with the foldable chair according to the invention performs two to four roles ranging from the suitcase to the cart, the chair and the buggy. When the auxiliary rails are used to linearly couple the foldable seat plate and the suitcase body, moreover, they function as diagonal beams in stead of the armrests.

The extensible fixing levers directed upward from both sides of the foldable base plate to both the respective sides of the suitcase body function as those supporting the foldable base plate vertically relative to the surface of the suitcase body and also preventing baggage on the foldable base plate from slipping off. The fixing devices also function as diagonal beams for the suitcase body and fix the foldable base plate substantially vertically to the suitcase body.

In the case of the foldable base plate formed with two flat plates different in length in the longer direction, attaching the wheels to the front end portion under the long flat plate allows the front end portion of the foldable base plate to be projected downward from the base portion of the suitcase body when the foldable base plate is folded up. Then the wheels mounted to the front end portion of the foldable base plate are settled below the suitcase body and seated on the floor surface with substantially the same height of the pair of wheels mounted to the suitcase body, whereby the suitcase body can be supported substantially horizontally relative to the floor surface. Moreover, as the wheels are hidden behind the bottom surface of the foldable base plate and not seen from the front side, the suitcase offers a good external appearance and looks nice.

When the suitcase is used as a chair or a cart, the handle mounted to the upper portion of the surface of the suitcase body is pulled up and used to steer the cart by gripping the handle with the hand. In a case where the suitcase with the foldable chair is used as a normal suitcase, the handle is pulled down and retained in the rear surface of the suitcase. The handle is thus not any hindrance to the suitcase holder and still makes the suitcase look nice.

BEST MODE FOR CARRYING OUT THE INVENTION

Figure 1:
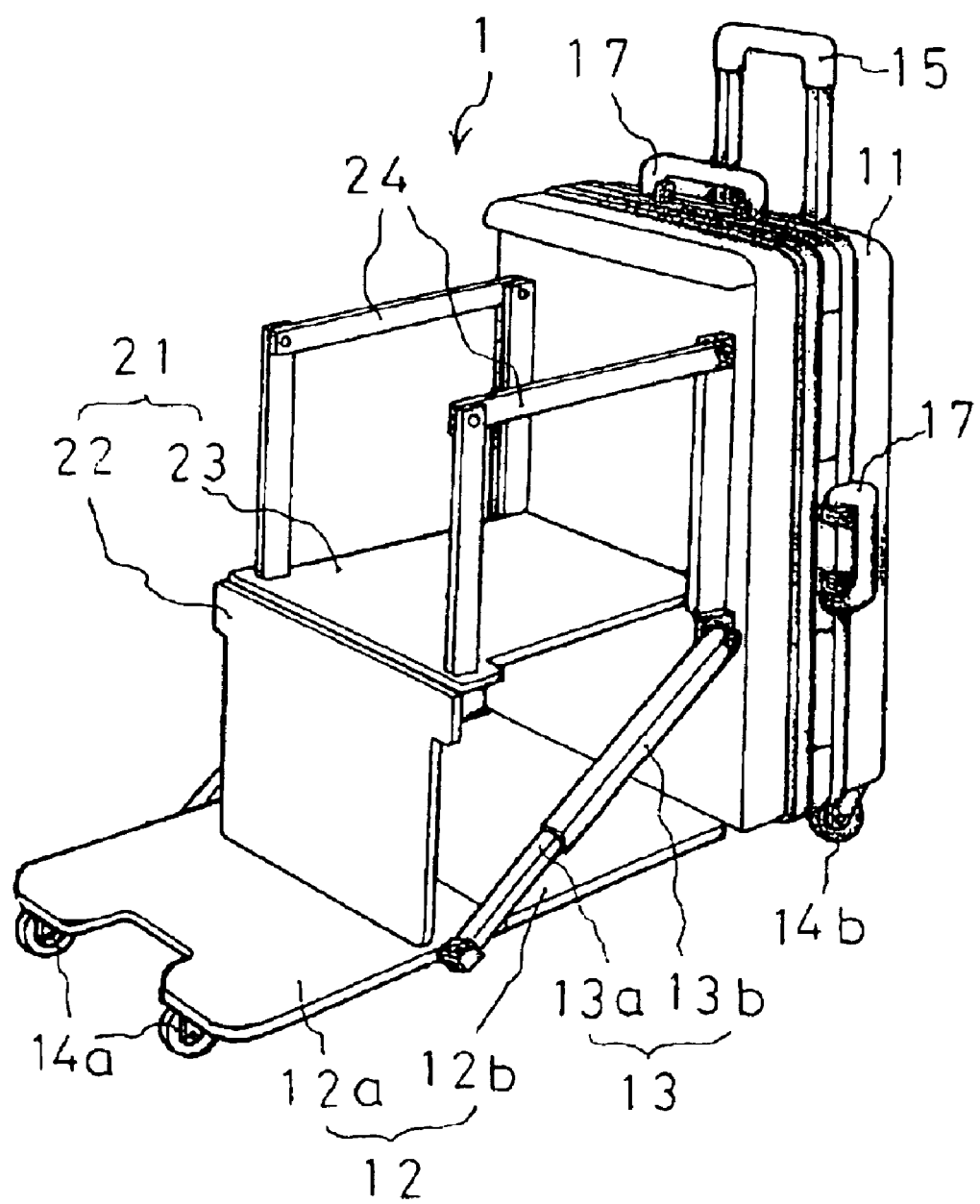
FIG. 1 is a perspective view illustrative of a suitcase with a foldable chair according to an embodiment of the invention in such a condition that the chair has been assembled on a foldable base plate.

An embodiment of the invention will now be described by reference to the drawings. FIG. 1 is a perspective view illustrative of a suitcase with a foldable chair according to an embodiment of the invention in such a condition that the chair has been assembled on a foldable base plate. In FIG. 1, reference numeral 1 denotes a suitcase with a foldable chair; 11, a suitcase body; 12, a foldable base plate; 13, fixing levers, 14*a*, front wheels; and 14*b*, rear wheels. Further, reference numeral 21 denotes a foldable seat plate; 22, a leg portion; 23, a seat portion; and 24, auxiliary rails.

Material for the manufacture of the foldable base plate 12 and the foldable seat plate 21 is typically any one of the light metals including but not limited to aluminum and duralumin. The foldable base plate 12 may also be fabricated by sticking a synthetic resin plate of such as reinforced plastics to a light metal frame, the reinforced plastics including acrylonitrile-butadiene-styrene resin (ABS), polycarbonate, fibrous glass reinforced plastics and the like. In other words, light metals, reinforced plastics and any other shock-resistant material are generally usable as materials for the suitcase body 11.

The foldable base plate 12 is mounted to the lower location of the surface of the box type suitcase body 11 with the foldable chair according to the embodiment of the invention. More specifically, the foldable base plate 12 is mounted on the surface of the suitcase body 11 with hinges, so that the foldable base plate 12 is made rotatable at least within a substantially vertical-to-horizontal angular range. Further, the foldable base plate 12 is formed with a front flat plate 12a and a rear flat plate 12b that are coupled together and is fixed to the suitcase body by the fixing levers 13 and 13 for coupling the intermediate portion of the front flat plate 12a to the suitcase body 11. Both the flat plates are coupled together by means of hinges with their bottom surfaces lying on top of each other or with their lateral edges making contact with each other and are made rotatable to the extent that both the flat plates level off. In this case, the joint between the front flat plate 12a and the rear flat plate 12b may be reinforced by reinforcing material or auxiliary wheels may also be provided near the joint (not shown).

Figure 5:
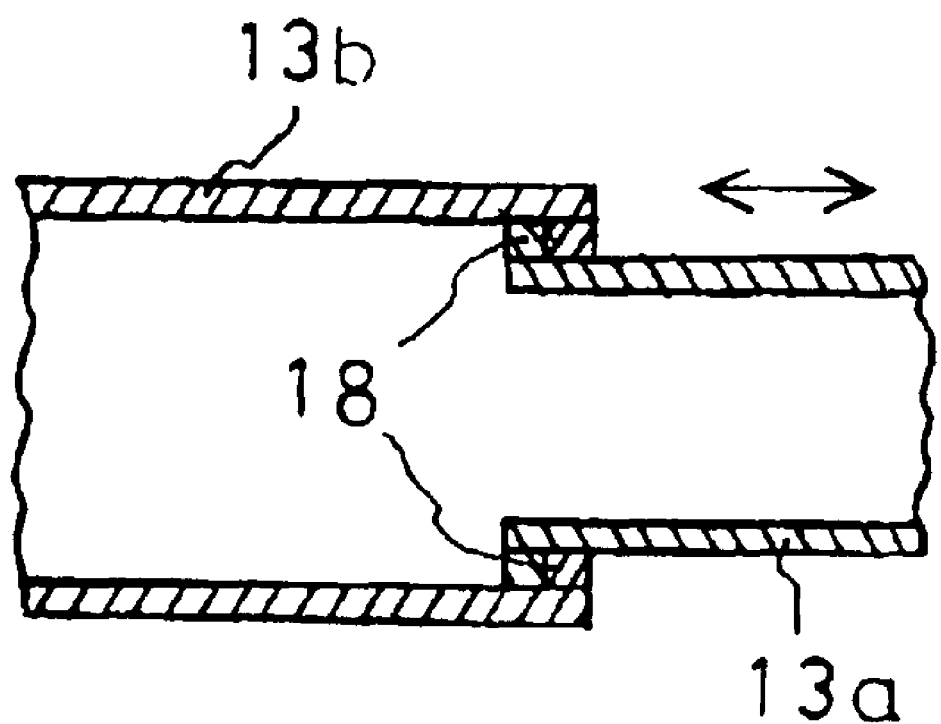
FIG. 5 is an enlarged vertical sectional view illustrative of a condition in which an upper fixing device and a lower fixing device have been latched together.

The front flat plate 12a as the constituent of the foldable base plate 12 is slightly longer than the rear flat plate 12b and formed with a cutout portion in front and a pair of front wheels 14a and 14a are attached to the bottom surface of the front flat plate with the cutout portion held therebetween. Each of the fixing lever 13 and 13 has an upper fixing lever 13b and a lower fixing lever 13a that are metal pipes rectangular in cross section and the lower fixing lever 13a is slidably inserted into the upper fixing lever 13b. As shown in FIG. 5 by way of example, latching projections 18 and 18 respectively formed on the inner side of the front portion of the upper fixing lever 13b and the outer side of the front portion of the lower fixing lever 13a latch each other so as to prevent both the pipes from coming out. Moreover, each fixing lever 13 may be fixed in an extended condition by any known fixing means such as bolts for fixing the joint between the upper fixing lever 13b and the lower fixing lever 13a (not shown).

Members for forming the chair will now be described. The foldable seat plate 21 is formed by rotatably coupling the leg portion 22 and the seat portion 23 together with the hinges. Tenons 25a mating with latching holes 16 of the foldable base plate 12 are provided at the front end of the leg portion 22 and the end portion of the seat portion 23 is rotatably attached to the substantially intermediate location of the surface side of the suitcase body 11. Each tenon 25a of the leg portion 22 is fixedly inserted into the latching hole 16 to form an auxiliary rail 24. Two long and narrow platelike bars are latched and rotatably coupled together at one point, and one end of each auxiliary rail is rotatably attached to the upper location of the surface of the suitcase body 11, whereas each tenon 25b is formed at the other end of the auxiliary rail. A latching hole is provided at a location where the latching hole mates with each tenon 25b of the seat portion 23 and by fitting the tenons 25b into the respective latching holes, the seat portion 23 is fixed to the auxiliary rails 24. In place of the tenons 25a and 25b, bolts and nuts may be used for fixing purposes. The joint between the auxiliary rails 24 may be bent at an acute angle with the other ends of the auxiliary rails fixed to the intermediate locations of the surface of the suitcase body to form armrests or otherwise each auxiliary rail 24 is formed into one barlike body, so that the foldable seat plate and the suitcase body are coupled diagonally (not shown).

Figure 3:
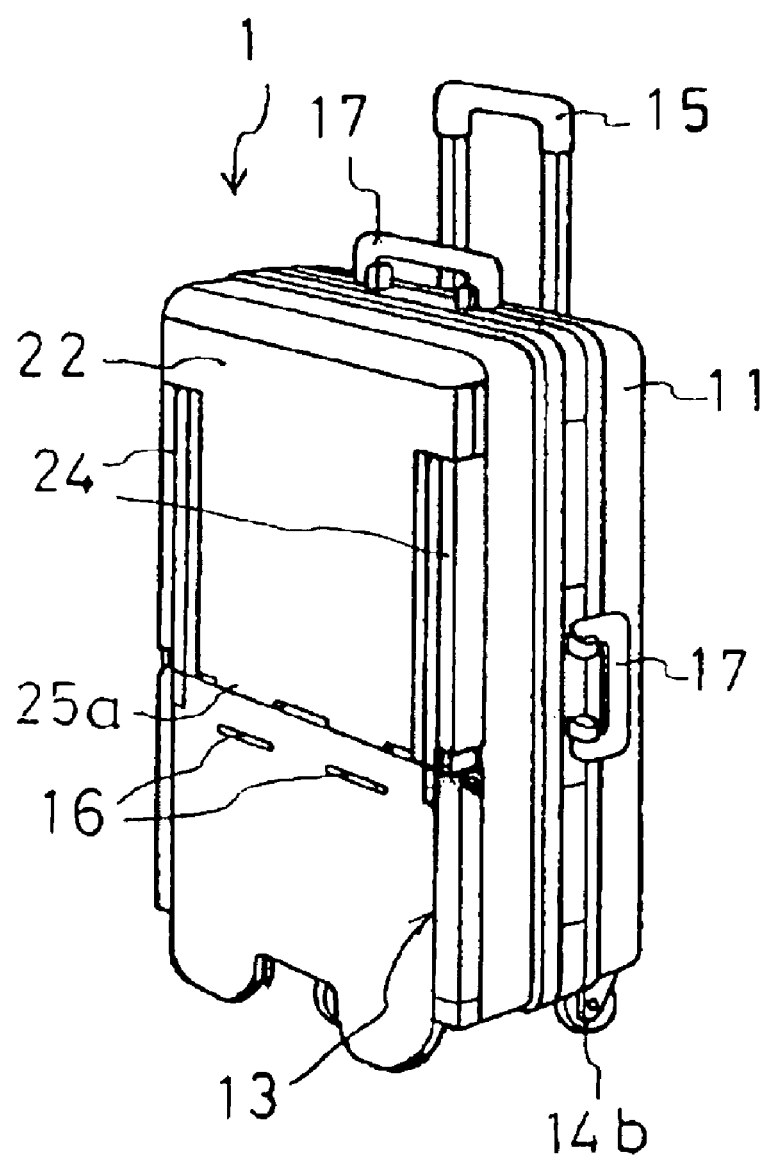
FIG. 3 is a perspective view illustrative of the suitcase with the foldable chair according to the embodiment of the invention in such a condition that each member has been folded up and retracted inside the surface of the suitcase body.

FIG. 3 is a perspective view of the suitcase with the foldable chair according to the embodiment of the invention in such a condition that the foldable base plate 12, the fixing levers 13, the foldable seat plate 21 and the auxiliary rails 24 have been folded up and retracted inside the surface of the suitcase body 11. The foldable base plate 12, the fixing levers 13, the foldable seat plate 21 and the auxiliary rails 24 are housed in the substantially same plane in the surface of the body 11. The front wheels 14a mounted to the front end portion of the foldable base plate 12 are made to come under the bottom side of the body 11 and together with the rear wheels 14b of the body 11 to support the suitcase 1 with the foldable chair above the floor surface. In this case, it is preferred to use known casters with stoppers as the wheels above in view of safety. Moreover, it is further preferred to provide a handle with a brake operating means whereby to provide a safety device such as a brake for stopping the wheels in response to the operation of the brake operating means (not shown).

When the foldable base plate 12 is folded up and drawn to the body surface, the lower fixing levers 13a of the right and left fixing levers 13 are fitted into the respective upper fixing levers 13b thereof and latched vertically to the body surface. In order to prevent the foldable base plate 12 and the foldable seat plate 21 from opening suddenly because of shock during the conveyance of the suitcase, a magnet, for example, or any other latching device may be used to make the foldable base plate 12 and the foldable seat plate 21 immovable from the body.

Example of Use

Figure 2:
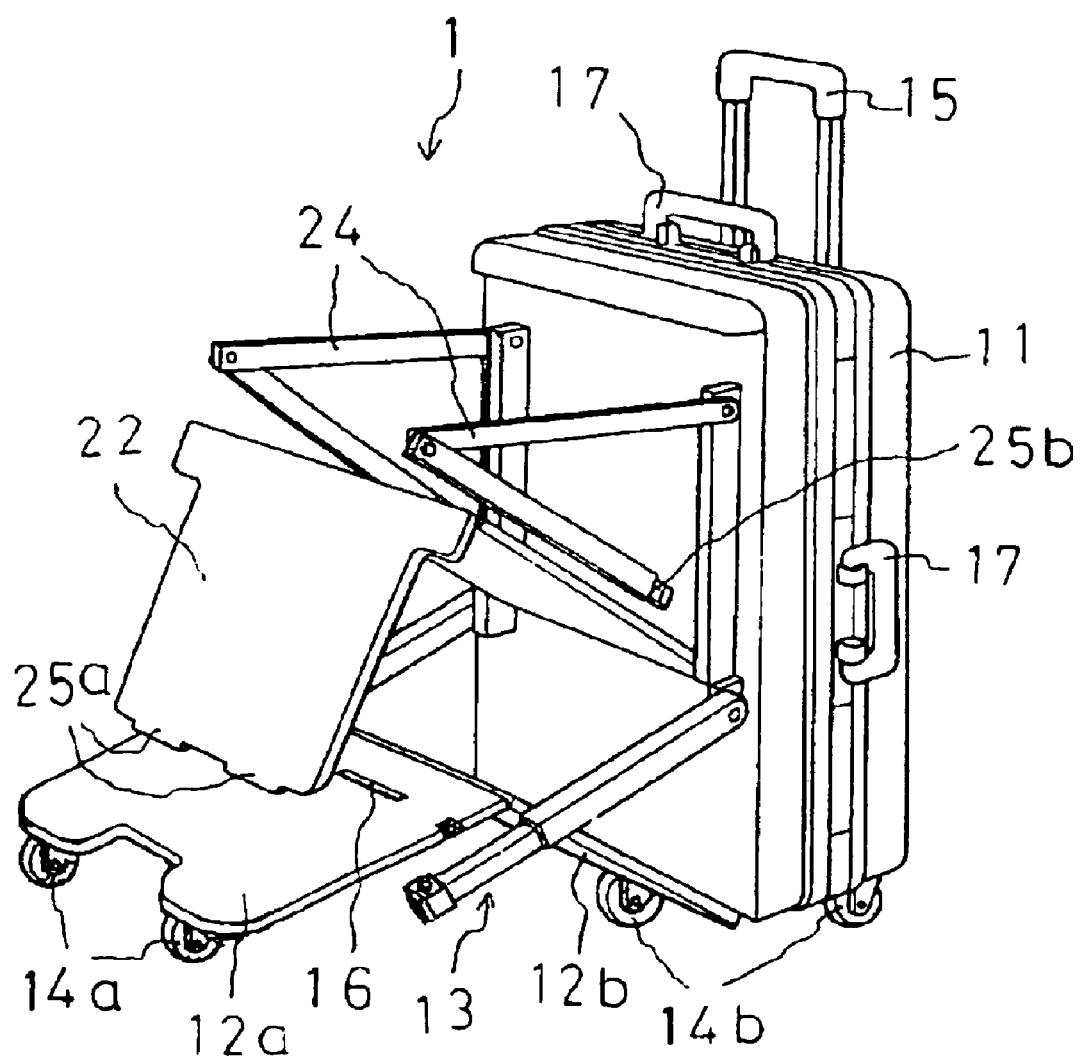
FIG. 2 is an exploded assembly drawing of the suitcase with the foldable chair according to the embodiment of the invention.
Figure 4:
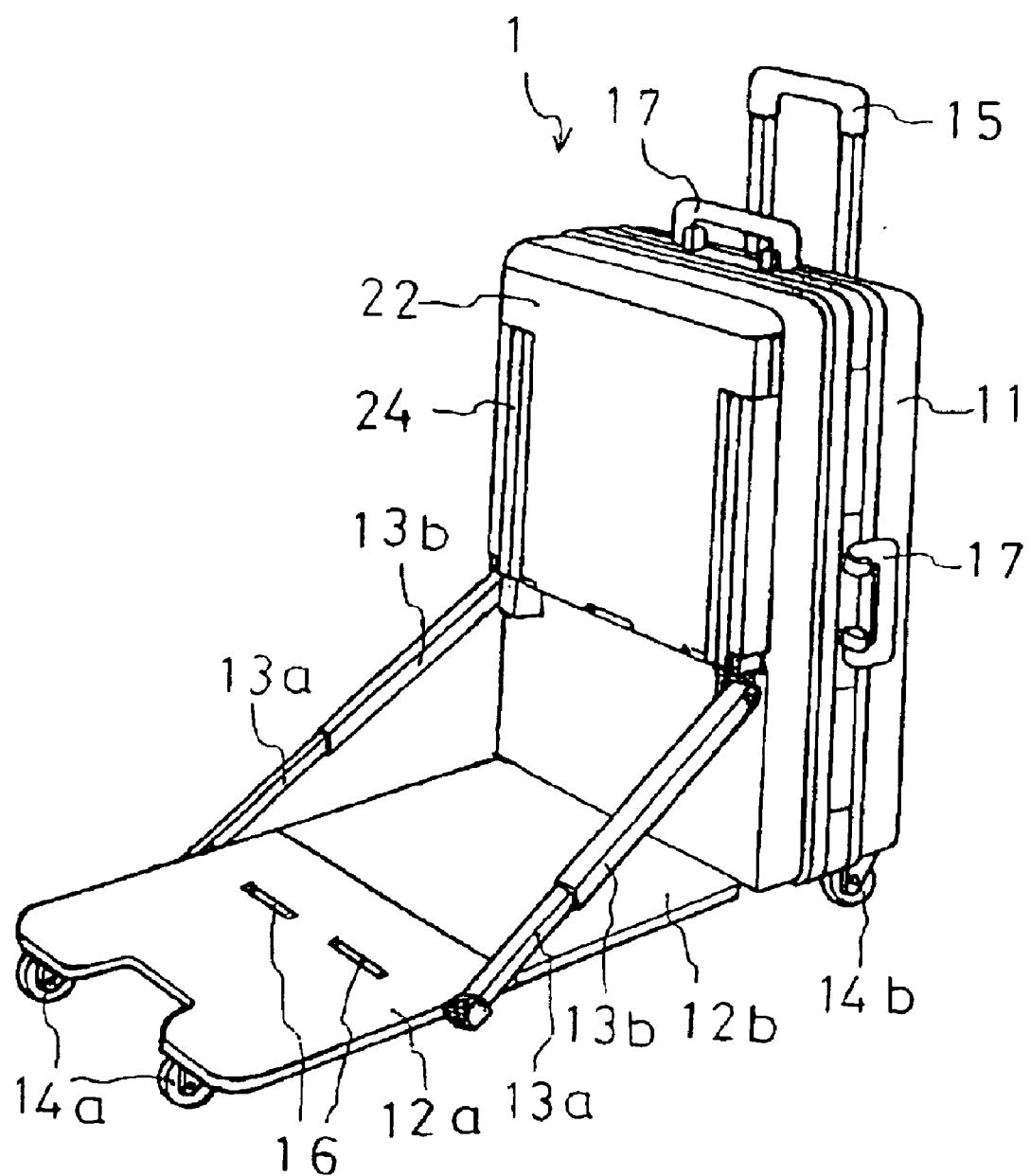
FIG. 4 is a perspective view illustrative of the suitcase with the foldable chair according to the embodiment of the invention in such a condition that the foldable base plate has been pulled out so as to assemble a cart.

A description will now be given of an exemplary use of the suitcase 1 with the foldable chair according to the embodiment of the invention. FIG. 2 is an exploded assembly drawing of the suitcase with the foldable chair and FIG. 4, a perspective view illustrative of the suitcase simultaneously used as a cart. The process of assembling a cart includes the steps of manually drawing out the lower portion of the front flat plate 12a forward until the foldable base plate 12 is flattened first, extending the fixing levers 13 to fix their front end portions to both the respective rear portions of the rear flat plate 12b and then drawing out a handle 15 upward so as to complete the assembly work. After the preparation of the cart is thus made, baggage is put on the foldable base plate 12 and made conveyable by pushing the handle 15 from behind. Further, the foldable base plate 12 is folded up and retracted inside the surface of the body in reverse order, whereby the assembly is needless to say usable as a normal suitcase.

A description will be given of an exemplary use of the suitcase 1 with the foldable chair as a chair or a buggy according to the embodiment of the invention. The process of assembling the chair or the buggy includes the steps of first completing the cart as described above and then assembling the chair on the foldable base plate 12 of the cart. The chair is assembled through the steps of drawing out the leg portion 22 on this side, perpendicularly bending the leg portion, fixedly inserting the front ends of the tenons 25a into the respective latching holes 16 of the front flat plate of the foldable base plate 12, drawing out of the auxiliary rails 24 and then fixedly inserting the front ends of the tenons 25b into the latching holes of the seat portion 23 so as to complete the assembly work. A series of these steps can be taken in reverse order for folding purposes and a cushion may be laid on the seat portion in consideration of making the chair comfortable to sit on. When the chair is offered to a child or an aged person, it is preferred to take safety measures, if necessary, to prevent the child or the aged person from falling down forward during traveling by putting a safety bar or a string between the auxiliary rails 24 and 24. It is also preferred to arrange, if necessary, not only a brake to be applied during traveling on a downward slope but also a stopper for preventing the suitcase with the foldable chair from moving unexpectedly while it is in a standby condition.

EFFECT OF THE INVENTION

The suitcase with the foldable chair so configured as described above according to the invention is usable as not only a normal suitcase but also a cart by pulling the foldable base plate inward, a chair or a buggy by further pulling the foldable seat plate inward. Assembly and disassembly do not require any troublesome work, and the suitcase is readily convertible into a cart for safely conveying pieces of hand baggage, souvenir bags and so forth together with the suitcase. Thus, the suitcase performs two to four roles ranging from the suitcase to the cart, the chair and the buggy, as the chair intended as a portable chair at the time of taking a rest in the airport and as the buggy intended for a child, an aged person who is lame in one or both legs or a physically handicapped person who needs emergency care. While the cart and the like are not in use, further, the suitcase is made reducible to convenient size only by folding up the cart and requires no useless space when it is in one's safekeeping, whereby the invention has the effect of allowing the suitcase to be readily carried around regardless of overseas or domestic travel.

What is claimed is:

1. A suitcase with a foldable chair, comprising:
   a suitcase body, said suitcase body having top and bottom surfaces, front and rear surfaces, and first and second side surfaces;
   a first pair of wheels, said wheels being connected to said bottom surface of the suitcase near the rear surface of said suitcase;
   a foldable base plate, said base plate having front and rear edges, said rear edge of said base plate being rotatably attached to said front surface of the suitcase proximate to said bottom surface of said suitcase, said front edge being adapted for extending distally from said bottom surface of said suitcase;
   a second pair of wheels, said second pair of wheels being connected to said front edge of the foldable base plate;
   first and second fixing devices, said fixing devices being connected to said front surface of said suitcase proximate to said first and second side surfaces of said suitcase, respectively, and said fixing devices being adapted for fixing the foldable base plate to said front surface of said suitcase;
   a foldable seat plate, said seat plate being rotatably connected to said front surface of the suitcase between said top and bottom surfaces of said suitcase; and
   first and second auxiliary rails, said rails being connected to said front surface of said suitcase proximate to said first and second side surfaces of said suitcase, respectively, said auxiliary rails being located intermediate said seat plate and said top surface of said suitcase, said auxiliary rails being adapted for forming armrests;
   wherein said foldable chair is adapted for being in a folded configuration so that:
   (1) said foldable base plate, the fixing devices, the foldable seat plate and the auxiliary rails are folded in substantially one plane against said front surface of said suitcase; and
   (2) said front edge of the foldable base plate and said second pair of wheels being proximate to said bottom surface of said suitcase and said first pair of wheels; and
   wherein said foldable chair is adapted for being in an unfolded configuration so that:
   (1) the foldable base plate, the fixing devices, the foldable seat plate and the auxiliary rails are unfolded; and
   (2) said front edge of said base plate and a said second pair of wheels being distal from said bottom surface of said suitcase and said first pair of wheels.

2. The suitcase of claim 1, wherein:
   the foldable seat plate is adapted for bending into a substantially right angle to form a horizontal seat portion and a perpendicular leg portion, said leg portion having a front and rear end;
   the front end of the leg portion being adapted for connecting to the foldable base plate; and
   said auxiliary rails having front ends, said auxiliary rails being adapted for bending into a substantially right angle for fixing said front ends of the auxiliary rails to the seat portion of the foldable seat plate.

3. The suitcase of claim 1, wherein:
   the fixing devices are extensible fixing levers, said fixing devices having top and bottom ends;
   said foldable base plate having first and second sides, said sides being proximate to said first and second side surfaces of said suitcase, respectively;
   said top end of said first and second fixing devices being rotatably mounted to the front surface of said suitcase and said bottom end of said first and second fixing devices being detachably connected to said first and second sides of the foldable base plate, respectively, so that the foldable base plate is connected to the front surface of the suitcase at a substantially right angle; and
   the foldable base plate being adapted for folding by removing said bottom end of each fixing device from the foldable base plate.

4. The suitcase of claim 1, wherein:
   the foldable seat plate and the auxiliary rails are adapted for being folded into a flat configuration, said flat configuration being adapted for pivoting against said front; and
   the front edge of the foldable base plate being adapted for positioning distal to said bottom surface of said suitcase and said first pair of wheels, and said front end of said fixing devises being adapted for supporting the foldable base plate at a substantially right angle with the front surface of the suitcase whereby said suitcase forms a cart.

5. The suitcase of claim 1, wherein:
   the foldable base plate further comprises first and second flat plates, said first plate being shorter than said second plate, each of said plates having a top end and a bottom end;
   said bottom end of said first plate being rotatably mounted to said front surface of said suitcase, proximal to said bottom surface of said suitcase;
   the second pair of wheels being provided proximal to said top end of said second plate; and
   the second pair of wheels being adapted for positioning proximate to said bottom surface of said suitcase, between said front edge of said base plate and said first pair of wheels when the foldable base plate is folded.

6. The suitcase of claim 1, wherein a handle is connected within said rear surface of the suitcase and said handle being adapted for extending from said rear surface to an extended position, and said handle being adapted for locking in said extended position.

* * * * *